United States Patent
Rowe et al.

(10) Patent No.: US 12,480,930 B2
(45) Date of Patent: Nov. 25, 2025

(54) MULTI-COLUMN GAS CHROMATOGRAPHY FOR ANALYSIS OF A FORMATION SAMPLE

(71) Applicant: Halliburton Energy Services, Inc., Houston, TX (US)

(72) Inventors: Mathew Dennis Rowe, Houston, TX (US); Jhanvi Manishkumar Kevadiya, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 456 days.

(21) Appl. No.: 18/070,046

(22) Filed: Nov. 28, 2022

(65) Prior Publication Data

US 2024/0175858 A1    May 30, 2024

(51) Int. Cl.
*G01N 30/46*    (2006.01)
*G01N 30/20*    (2006.01)
*G01N 30/60*    (2006.01)
*G01N 30/86*    (2006.01)
*G01N 33/24*    (2006.01)
(Continued)

(52) U.S. Cl.
CPC .............. *G01N 33/24* (2013.01); *G01N 30/20* (2013.01); *G01N 30/6043* (2013.01); *G01N 30/8679* (2013.01); *G01N 2030/025* (2013.01); *G01N 2030/8804* (2013.01)

(58) Field of Classification Search
CPC .................................................... G01N 30/461
See application file for complete search history.

(56) References Cited

U.S. PATENT DOCUMENTS 5,492,555 A    2/1996    Strunk et al.
8,536,524 B2   9/2013    Pomerantz et al.
(Continued)

FOREIGN PATENT DOCUMENTS

CN    209841791    12/2019
WO    2019011581    1/2019

OTHER PUBLICATIONS

"PCT Application No. PCT/US2022/080712, International Search Report and Written Opinion", Aug. 21, 2023, 9 pages.

*Primary Examiner* — John E Breene
*Assistant Examiner* — Alex T Devito
(74) *Attorney, Agent, or Firm* — DeLizio, Peacock, Lewin & Guerra LLP

(57) ABSTRACT

Embodiments of multi-column gas chromatography for analysis of a formation sample are disclosed. In one embodiment, an apparatus comprises a gas chromatography instrument and a controller. The gas chromatography instrument comprises a sample injector; a primary column to separate out a hydrocarbon subset; a secondary column valve coupled to the primary column; a primary detector configured to analyze the hydrocarbons of the subset; a heart cutting unit coupled to the secondary column valve and configured to cut, from the subset, at least one isomer having a weight greater than a threshold; a secondary column coupled to an output of the heart cutting unit configured to separate out the at least one isomer; and a secondary detector configured to analyze the at least one isomer. The controller controls the secondary column valve to output the hydrocarbons to the heart cutting unit in response to at least one trigger event.

20 Claims, 8 Drawing Sheets

(51) Int. Cl.
  *G01N 30/02*  (2006.01)
  *G01N 30/88*  (2006.01)

(56) References Cited

U.S. PATENT DOCUMENTS

| | | |
|---|---|---|
| 8,592,755 B2 | 11/2013 | Lu et al. |
| 9,228,984 B2 | 1/2016 | Lu et al. |
| 9,932,279 B2 | 4/2018 | Wright et al. |
| 2004/0249512 A1 | 12/2004 | Meeuwssen et al. |
| 2017/0248558 A1* | 8/2017 | Roques ................. G01N 30/30 |
| 2020/0033301 A1* | 1/2020 | Cardin ............... G01N 30/6039 |

* cited by examiner

MULTI-COLUMN GAS CHROMATOGRAPHY FOR ANALYSIS OF A FORMATION SAMPLE

BACKGROUND

The disclosure generally relates to formation evaluation for subsurface formations and more particularly, to multi-column gas chromatography for analysis of a formation sample.

As part of hydrocarbon recovery from subsurface formations, evaluation of the hydrocarbon reservoirs from such formations is performed to maximize recovery and minimize costs. Formation evaluation can generally include collection of formation fluid samples for analysis of their hydrocarbon content.

BRIEF DESCRIPTION OF THE DRAWINGS

Embodiments of the disclosure may be better understood by referencing the accompanying drawings.

DESCRIPTION

Figure 1:
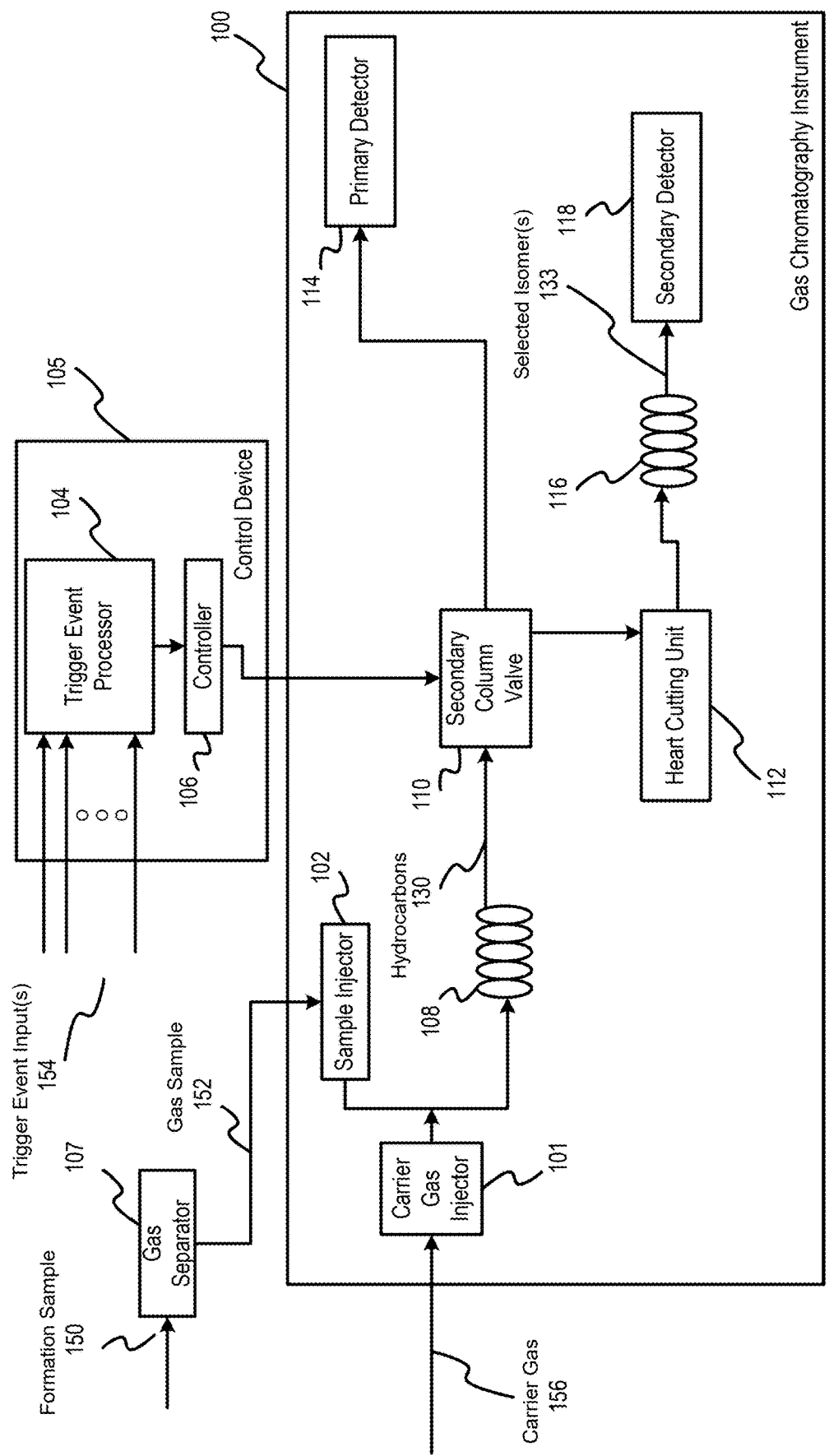
FIG. 1 depicts a first example of a multi-column gas chromatography instrument and control device, according to some embodiments.

The description that follows includes example systems, methods, techniques, and program flows that embody aspects of the disclosure. However, it is understood that this disclosure may be practiced without these specific details. For instance, this disclosure refers to analysis of active formation samples from a wellbore during drilling in illustrative examples. Aspects of this disclosure can also be applied to formation samples during other stages of wellbore operations. For example, aspects of this disclosure may also be applied to analysis of formation samples during post drilling operations (such as a production operation). In other instances, well-known instruction instances, protocols, structures, and techniques have not been shown in detail in order not to obfuscate the description.

Example embodiments may include analysis of formation samples that include gas chromatography. For example, example embodiments may be used as part of a formation evaluation of a subsurface formation from which the formation sample originates. Such embodiments may be used to detect and analyze hydrocarbons in formation samples. In conventional approaches for gas chromatography, the separation of isomers for hexane and greater weight hydrocarbons has been done by setting up a sole purpose gas chromatography to separate isomers. In contrast, example embodiments may include a single gas chromatography instrument with multiple columns and detectors. For example, a gas chromatography (GC) instrument may include a primary column and detector and one or more secondary columns and detectors.

In some embodiments a GC instrument may be designed with primary and secondary columns and detectors. The columns may be of varied designs and materials. The detectors may be any type of instrument to measure analytes in a gas. Examples of such detectors may be Flame Ionization Detector (FID), Photoionization Detector (PID), Thermal Conductivity Detector (TCD), Mass Spectrometry (MS) detector, or another types. A control system may be included that can receive external inputs for controlling activation of one or more secondary columns and detectors in the GC instrument. The primary column would be of the design to allow C1 to C8+ analysis with FID or another detector. The secondary column may be selected for analysis of a specific set of isomers, such as just for 6 carbon isomers, or optimized to be used on 6, 7, 8, or higher isomer separation that would be directed by an automated program or triggered by a preset condition or event. The automation may be initialized by trigger events or not.

In some embodiments, a control device may be coupled to the gas chromatography instrument for controlling the gas chromatography instrument. For example, the control device may control the opening and closing of the valve to enable use of the one or more secondary columns and detectors. Additionally, the control device may be configured to receive one or more external inputs for controlling the gas chromatography instrument. For example, the control device may receive inputs that identify when one or more trigger events has occurred.

The trigger events may be one or more events related to the sample being tested. An example trigger event may be a depth or depth range of a wellbore from which the formation sample is retrieved. Other example trigger events may include detection of a chemical species of interest in the sample, a minimum total gas level in the sample, etc. In some implementations, multiple trigger events may be incorporated to switch between different isomer detection. Examples of such trigger events may include presence within the formation sample of one or more isomers having a weight greater than a certain threshold. For instance, the trigger event may include presence within the formation sample of one or more isomers having a weight greater than hexane. If the one or more trigger events are present, a valve positioned after the primary column but prior to the primary detector may be opened. A heart cut unit may be coupled to receive the formation sample from the open valve to heart cut for a particular isomer or isomers. Heart cut may also be referred to as two-dimensional gas chromatography. The output of the heart cut may then be input into one or more secondary columns and secondary detectors that could be for isomers of having a weight of hexane and heavier and/or to a specialty method for extended detection such as simulated thermal distillation. Thus, example embodiments may include an automated method that activates use of the one or more secondary columns and detectors if one or more trigger events are present. In some implementations, multiple trigger events may be used to activate one or more secondary columns/detectors. For example, multiple trigger events may be used to switch between detection of different isomer(s).

Thus, example embodiments may include automation to switch between one column (primary) and multi-column (primary and secondary) operations. For instance, the primary column may be used to separate out one or more hydrocarbons (such $C_1$, $C_2$, $C_3$, $C_4$, $C_5$, $C_6$, $C_7$, $C_8$, etc.). The secondary column(s) may be used to separate out one or more isomers. For example, the secondary column may be to separate out isomers having a weight that is greater than a defined threshold. For instance, the secondary column(s) may be configured to separate 6 carbon isomers (such as hexane) out for analysis or optimized to be used on 6, 7, 8, or higher isomer separation.

In some implementations, the carrier gas may be changed to optimize detection in the secondary system. In some embodiments, the primary system may automatically back flush into the secondary system for simulated thermal distillation or other specialty methods that analyze hydrocarbons that are heavier than the primary system is designed to separate and detect. Thus, example embodiments overcome limits of full analysis on single or dual column gas chromatography instruments.

Examples of Gas Chromatography Instrument and Control Device

Figure 2:
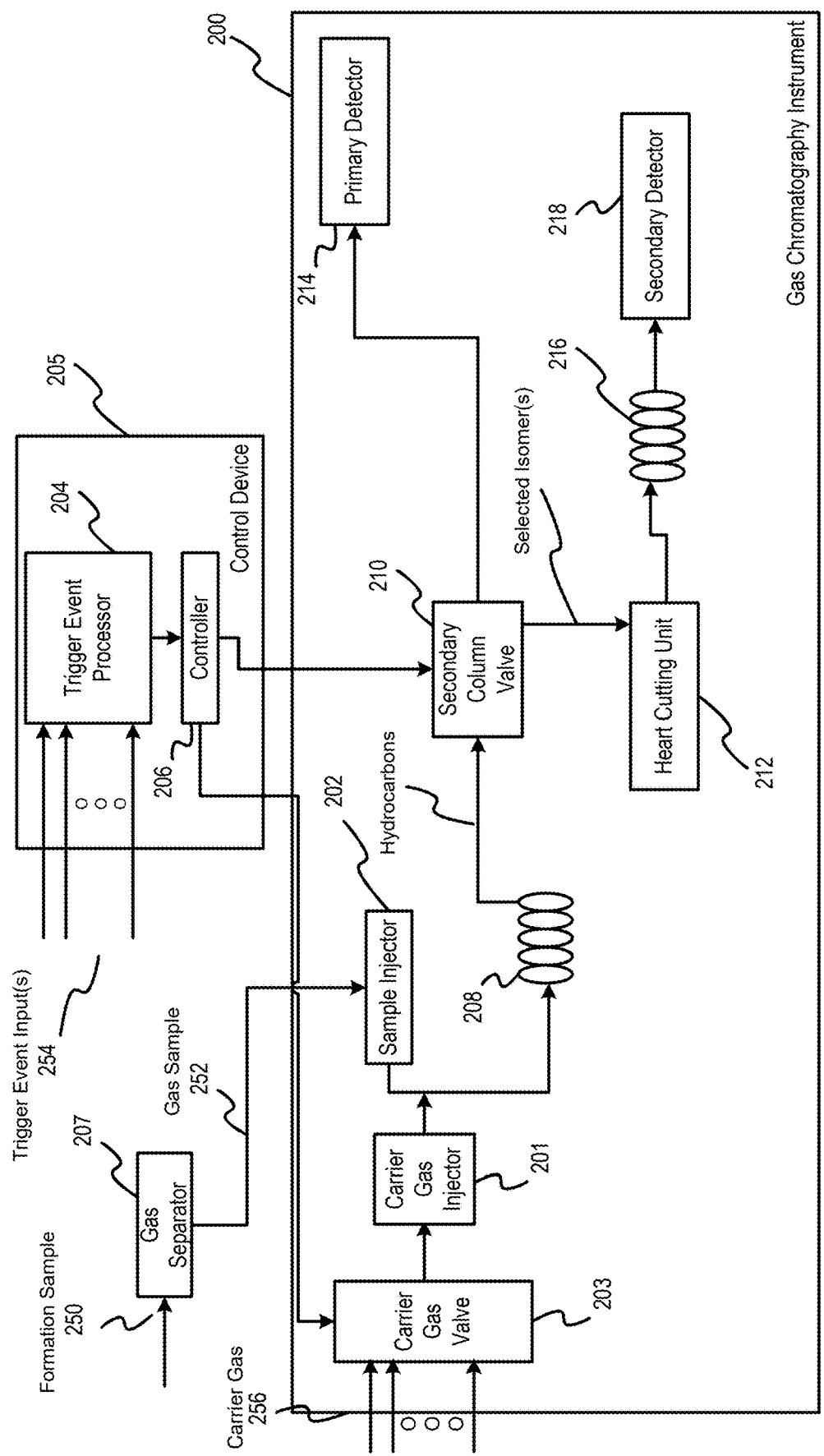
FIG. 2 depicts a second example of a multi-column gas chromatography instrument and control device that allows for multiple carrier gases, according to some embodiments.
Figure 3:
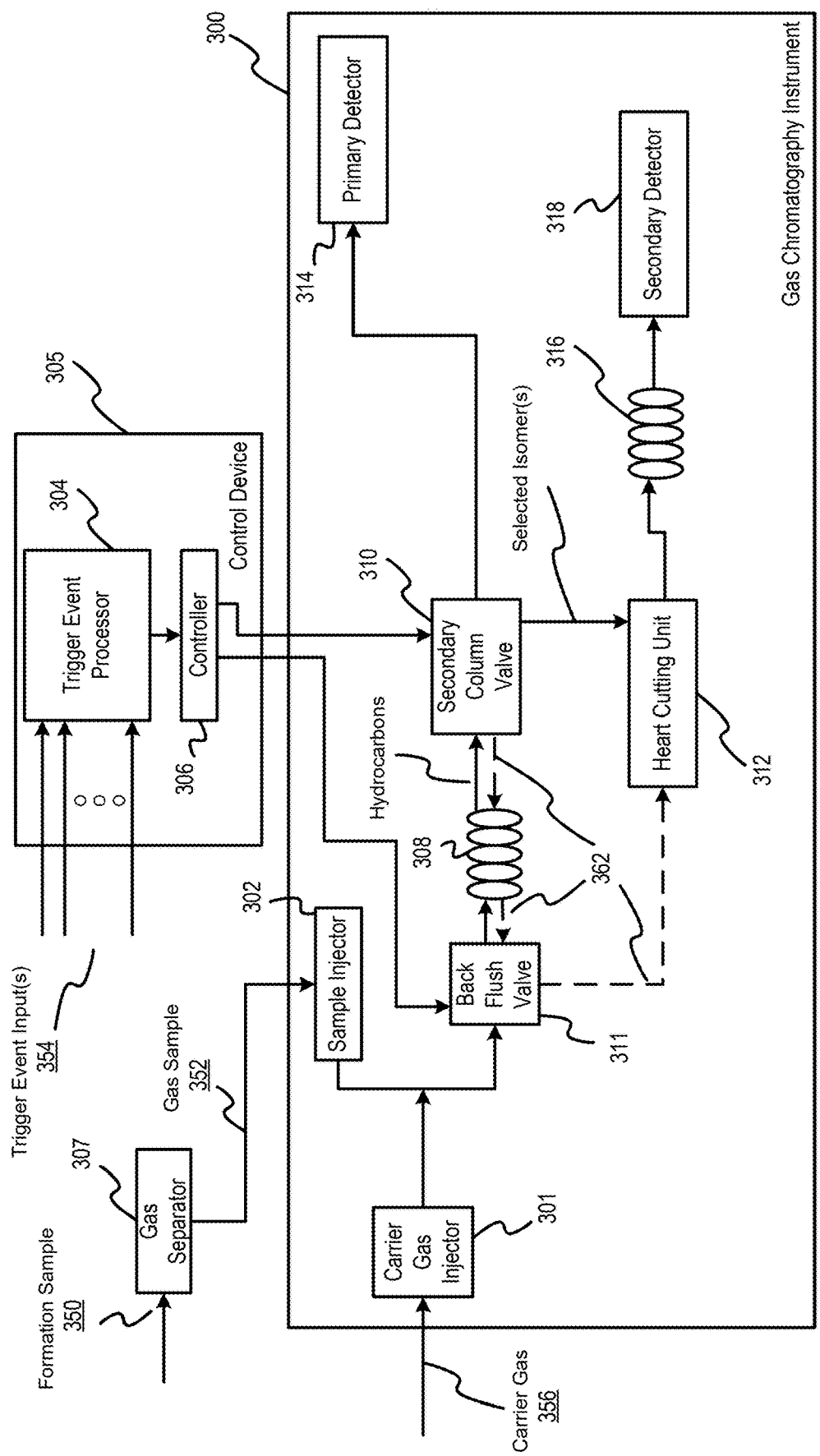
FIG. 3 depicts a third example of a multi-column gas chromatography instrument and control device that includes a back flush valve, according to some embodiments.
Figure 4:
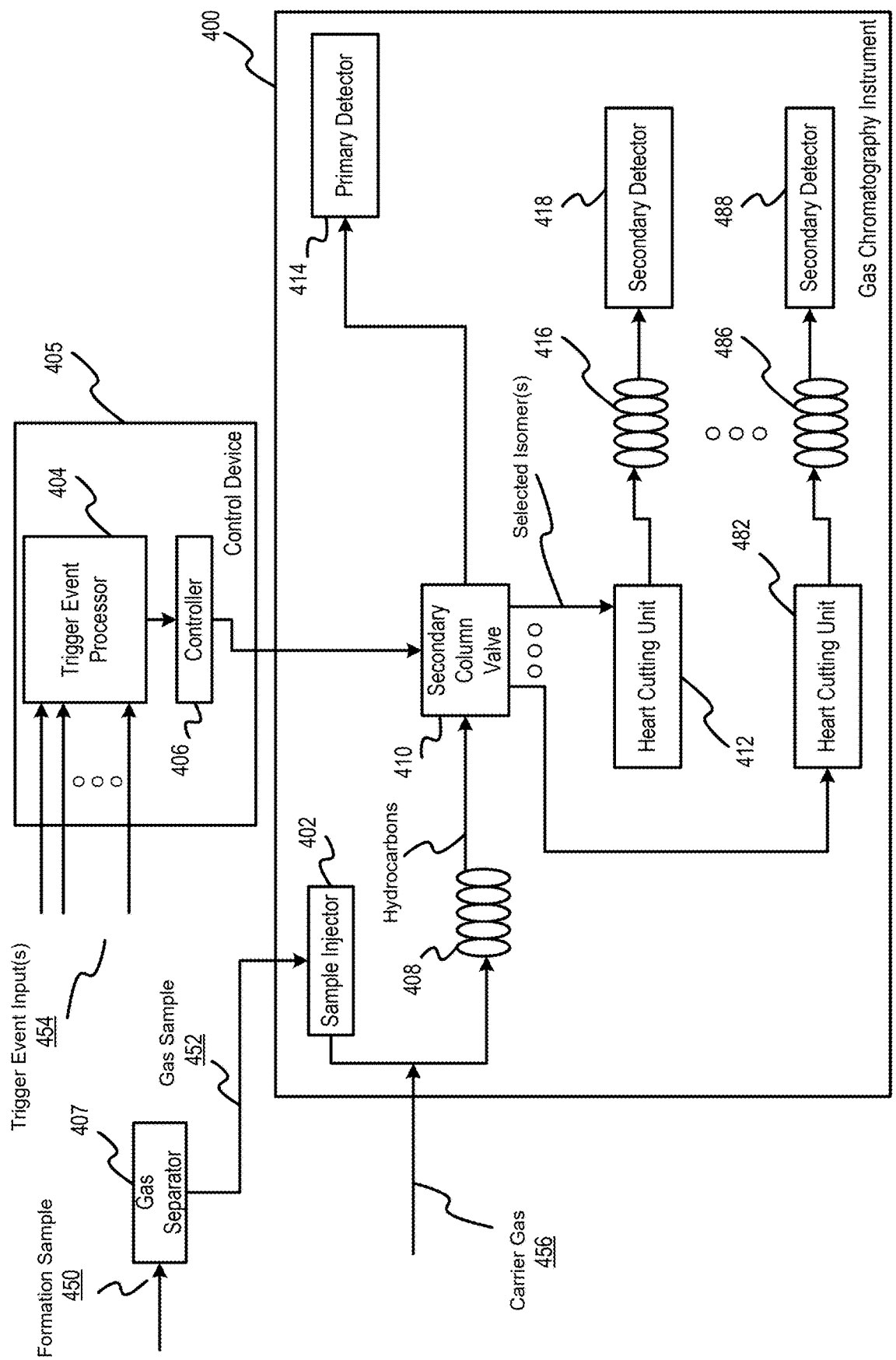
FIG. 4 depicts a fourth example of a multi-column gas chromatography instrument and control device that includes multiple secondary columns and detectors, according to some embodiments.

Different example implementations of a gas chromatography instrument and control device are now described with reference to FIGS. 1-4. While described separately, the example implementations of FIGS. 1-4 can be incorporated together. For example, FIG. 2 depicts an example implementation that allows for multiple carrier gases. FIG. 3 depicts an example implementation that includes a back flush valve. FIG. 4 depicts an example implementation that includes multiple secondary columns/detectors. In some implementations, an example gas chromatography instrument may include any combination of the use of multiple carrier gases, a back flush valve, and multiple secondary columns/detectors.

FIG. 1 depicts a first example of a multi-column gas chromatography instrument and control device, according to some embodiments. FIG. 1 depicts a gas chromatography instrument 100 and a control device 105 communicatively coupled to control the gas chromatography instrument 100. FIG. 1 also includes a gas separator 107.

The gas chromatography instrument 100 includes a sample injector 102, a carrier gas injector 101, a primary column 108, a primary detector 114, a secondary column valve 110, a heart cutting unit 112, a secondary column 116, and a secondary detector 118. The control device 105 includes a trigger event processor 104 and a controller 106.

The gas separator 107 is coupled to receive a formation sample 150 and to separate out a gas sample 152 from the liquid and solids of the formation sample 150. The formation sample 150 may be an active sample taken during a drilling or downhole process and may include fluid from the formation mixed in with drilling or processing fluid. The gas sample 152 is input into the sample injector 102. The gas sample may include a number of chemical compounds. The sample injector 102 may be configured to inject the gas sample 152 into the gas chromatography instrument 100. The carrier gas injector 101 may also inject a carrier gas 156 into the gas chromatography instrument 100. The carrier gas 156 can carry the chemical compounds of the gas sample 152.

The primary column 108 may separate out a hydrocarbon subset that includes hydrocarbons from the number of chemical compounds. In some embodiments, the primary column 108 may be a capillary column that may separate out from the gas sample 152 a hydrocarbon subset that may include one or more hydrocarbons (hydrocarbons 130). The secondary column valve 110 is positioned between the primary column 108 and the primary detector 114. The secondary column valve 110 may receive an output from the primary column 108. The secondary column valve 110 passes the hydrocarbons 130 through to the primary detector 114. The primary detector 114 may be configured to analyze the hydrocarbons of the hydrocarbon subset. In some implementations, the primary detector 114 may analyze hydrocarbons having a weight that is considered "lighter." For example, the primary detector 114 may analyze hydrocarbons having a weight that is less than a first/low weight threshold. For instance, the primary detector 114 may provide analysis of $C_1$, $C_2$, $C_3$, $C_4$, $C_5$, $C_6$, $C_7$, $C_8$, etc. The first/low weight threshold may be user defined for certain applications and formations. In some embodiments, the first/low threshold range may be $C_6$, for example.

The separation of isomers for hexane and greater weight hydrocarbons is traditionally done by setting up a sole purpose gas chromatography unit to separate the isomers. The selected isomers may include a very specific set of isomers and ratios. Separating the isomers across the primary column 108 may not provide enough peak resolution for isolation of the isomers. This may vary by reservoir or formation. To address this problem, the gas chromatography instrument 100 includes the secondary column 116 and the secondary column valve 110 to switch between the primary column 108 and primary detector 114 and secondary column 116 and secondary detector 118, wherein the secondary column 116 and secondary detector 118 are selected to separate isomers having a second/heavy weight threshold for heavier isomers. For example, the secondary column and secondary detector 118 may process isomers of hexane, e.g., and heavier or to a specialty method for extended detection such as simulated thermal distillation to get a better separation of the isomers.

The heart cutting unit 112 may be coupled to a second output of the secondary column valve 110 and be configured to cut, from the hydrocarbon subset, at least one isomer having a weight greater than a second/heavy weight threshold. The second/heavy weight threshold may be user defined for certain applications and formations. In some embodiments, the first/low threshold range may be $C_6$, for example. The control device 105 may control the secondary column valve 110 by opening and closing an output of the hydrocarbons 130 to the heart cutting unit 112 based on the occurrence of at least one trigger event 154. The trigger event processor 104 may receive one or more trigger events 154 as input and process these trigger events 154 to determine whether to activate analysis of selected isomer(s) using the secondary column 116 and detector of the gas chromatography instrument 100. The trigger event 154 may be any event related to the formation sample 150. For example, this may include analysis of isomers having a weight that is greater than the second/heavy weight threshold.

The occurrence of at least one trigger event 154 may result in the controller 106 causing the secondary column valve 110 to open to allow for analysis of at least one selected isomer(s). For instance, the trigger event 154 event may be the presence of any isomers in the gas sample 152 having a weight that is the same or greater than hexane. Other example trigger events may include a set depth or depth range in a wellbore from which the formation sample 150 originates, detection of a chemical species of interest in the formation sample 150, a minimum total gas level in the formation sample 150, the number of chemical compounds including at least one isomer having a weight greater than an isomer or heavy weight threshold, etc. In some examples, the depth range may be determined to have a probability of recoverable hydrocarbon that is greater than a predetermined threshold. In some examples, this predetermined threshold may be defined in terms of the probability of likely recovery of hydrocarbons for the depth range. For example, the probability can be 25% or greater, 50% or greater, 75% or greater, etc. In some implementations, this predetermined threshold may be configurable by a user. Other trigger events 154 may include determining that an amount of gas in the gas sample exceeds a minimum gas level threshold.

Certain isomers may take longer to analyze in a primary column and separation may become a problem such that distinguishing between various isomers may not be possible. When a triggering event 154 identifies one of these isomers, the controller 106 may open the secondary column valve 110 to open such that the hydrocarbons enter the heart cutting unit 112 to cut selected isomer(s) 133. The secondary column 116 may be coupled to the output of from the heart cutting unit 112. The secondary column 116 receives the output from the heart cutting unit 112 and separates out at the least one selected isomer from the hydrocarbons. The secondary detector 118 may be configured to analyze the at least one selected isomer separated out. Once the heart cutting unit 112 has completed primary physical separation, the control valve 110 may switch operations back to the primary column 108.

The triggering event(s) 154 may be set based on what isomers or chemicals are desired to target from a reservoir. Multiple trigger events 154 may be incorporated to switch between different isomer detection. In some examples, the secondary system (secondary column 116 and secondary detector 118) could be heart cut after primary column 108 void volume and before the first hydrocarbon detection for inorganic species detection. The primary system (primary column 108 and primary detector 114) may be optimized for the specific organic species separation and detection and the secondary system may be optimized for a different selected species. In other implementations, the carrier gas could be changed to optimize detection in the second system. The primary system could automatically back flush into the secondary system for simulated thermal distillation or other specialty methods that analyze hydrocarbons that are heavier than the primary system is designed to separate and detect.

Once processing and analysis of the formation sample 150 is complete, the controller 106 is configured to communicate with a device positioned downhole in the wellbore. The device may perform or adjust a downhole operation in a wellbore based on analysis of at least one of the hydrocarbon subsets from the formation sample 150 and the at least one isomer separated out. For example, a drilling speed or direction may be adjusted, a drilling path or target may be adjusted, and various other operation adjustments may be made.

FIG. 2 depicts a second example of a multi-column gas chromatography instrument and control device that allows for multiple carrier gases, according to some embodiments. FIG. 2 depicts a gas chromatography instrument 200 and a control device 205 communicatively coupled to control the gas chromatography instrument 200. FIG. 2 also includes a gas separator 207.

The gas chromatography instrument 200 is similar to the gas chromatography unit of FIG. 1 and similarly includes a sample injector 202, a carrier gas injector 201, a primary column 208, a primary detector 214, a secondary column valve 210, a heart cutting unit 212, a secondary column 216, and a secondary detector 218. The control device 205 includes a trigger event processor 204 and a controller 206.

The gas chromatography instrument 200 further includes a carrier gas valve 203. The carrier gas valve 203 may be a multi-port valve configured to receive multiple inputs, such as two or more carrier gases 256. The primary column 208 and secondary column 116 may be used to detect different isomers or gases. Different carrier gases 256 may be chosen based on the selected isomers desired for separation, and may be changed during drilling operations. For example, the primary column 208 may be used to detect hydrogen and the second column may be used to detect one or more hydrocarbons or other gases. When the system is trying to detect hydrogen, hydrogen cannot be used as the carrier gas and as such, the carrier gas valve 203 will need to direct a different carrier gas 256 into the primary column.

The carrier gas valve 203 may be coupled with the controller 206 for controlling the opening of the valve ports to receive the multiple inputs. Once the desired carrier gases are determined, the carrier gas may then be mixed with the gas sample 252 in the carrier gas injector 201 and proceed to either the primary column 208 or the secondary column valve 210 for processing. In some implementations, the carrier gas valve 203 may switch between the two or more carrier gases 256 during real-time monitoring and detecting process of samples 250 collected from the formation based on various triggering events 254 that may occur during drilling.

FIG. 3 depicts a third example of a multi-column gas chromatography instrument and control device that includes a back flush valve, according to some embodiments. FIG. 3 depicts a gas chromatography instrument 300 and a control device 305 communicatively coupled to control the gas chromatography instrument 300. FIG. 3 also includes a gas separator 307.

The gas chromatography instrument 300 is similar to the gas chromatography units of FIG. 1 and FIG. 2 for processing and analyzing a formation sample 350 and similarly includes a sample injector 302, a carrier gas injector 301 to inject one or more carrier gases 356 into the gas chromatography instrument 300, a primary column 308, a primary detector 314, a secondary column valve 310, a heart cutting unit 312, a secondary column 316, and a secondary detector 318. The control device 305 includes a trigger event processor 304 and a controller 306.

The gas chromatography instrument 300 further includes a back flush valve 311. In some examples, the trigger event processor 304 may detect a triggering event 354 that results in the controller 306 opening the back flush valve 311 to back flush the gas sample 352 to the heart cutting unit 312 and the secondary column 316 and secondary detector 318 for simulated thermal distillation or other specialty methods that analyze hydrocarbons that are heavier than the primary column 308 and primary detector 314 may be able to separate and detect.

In some implementations, the secondary column valve 310 may be a multi-port valve such that a gas sample may flow backwards through the primary column 308 and into the back flush valve 311. The gas sample may then flow from the back flush valve 311 into the heart cutting unit 312. For example, the heavier hydrocarbons, such as $C_8$ or above, may have a very slow transient time across a column or get stuck at one end thereof. If this is detected, then the gas may be backflushed through the back flush valve 311 to the heart cutting unit 312, and then to the secondary column 316 and secondary detector 318.

FIG. 4 depicts a fourth example of a multi-column gas chromatography instrument and control device that includes multiple secondary columns and detectors, according to some embodiments. FIG. 4 depicts a gas chromatography instrument 400 and a control device 405 communicatively coupled to control the gas chromatography instrument 400. FIG. 4 also includes a gas separator 407.

The gas chromatography instrument 400 is similar to the gas chromatography units of FIGS. 1, 2, and 3 and similarly includes a sample injector 402 for receiving a gas sample 452 from the gas separator 407, a carrier gas injector 401 to inject one or more carrier gases 456 into the gas chromatography instrument 400, a primary column 408, a primary detector 414, a secondary column valve 410, a unit 412, a secondary column 416, a secondary detector 418. The control device 405 includes a trigger event processor 404 and a controller 406.

The gas chromatography instrument 400 further includes a second heart cutting unit 482, a second secondary column 486, and a second secondary detector 488. There may be situations when there may be multiple hydrocarbons in the formation sample 450. When a trigger event 454 occurs indicating that there are multiple heavy hydrocarbons, the second heart cutting unit 482, second secondary column 486, and second secondary detector 488 may be used to separate additional hydrocarbons. For example, the trigger event 454 may indicate multiple selected isomers detected in the formation sample. The more than one selected isomers may need to be processed separately. The secondary column valve 410 may be a multi-port valve and may output the hydrocarbons into both the heart cutting unit 415 and the second heart cutting unit 482. The secondary column 416 and second secondary column 486 may be used to separate out different selected isomers for detection by their respective detectors 418 and 488.

Example Operations

Figure 5:
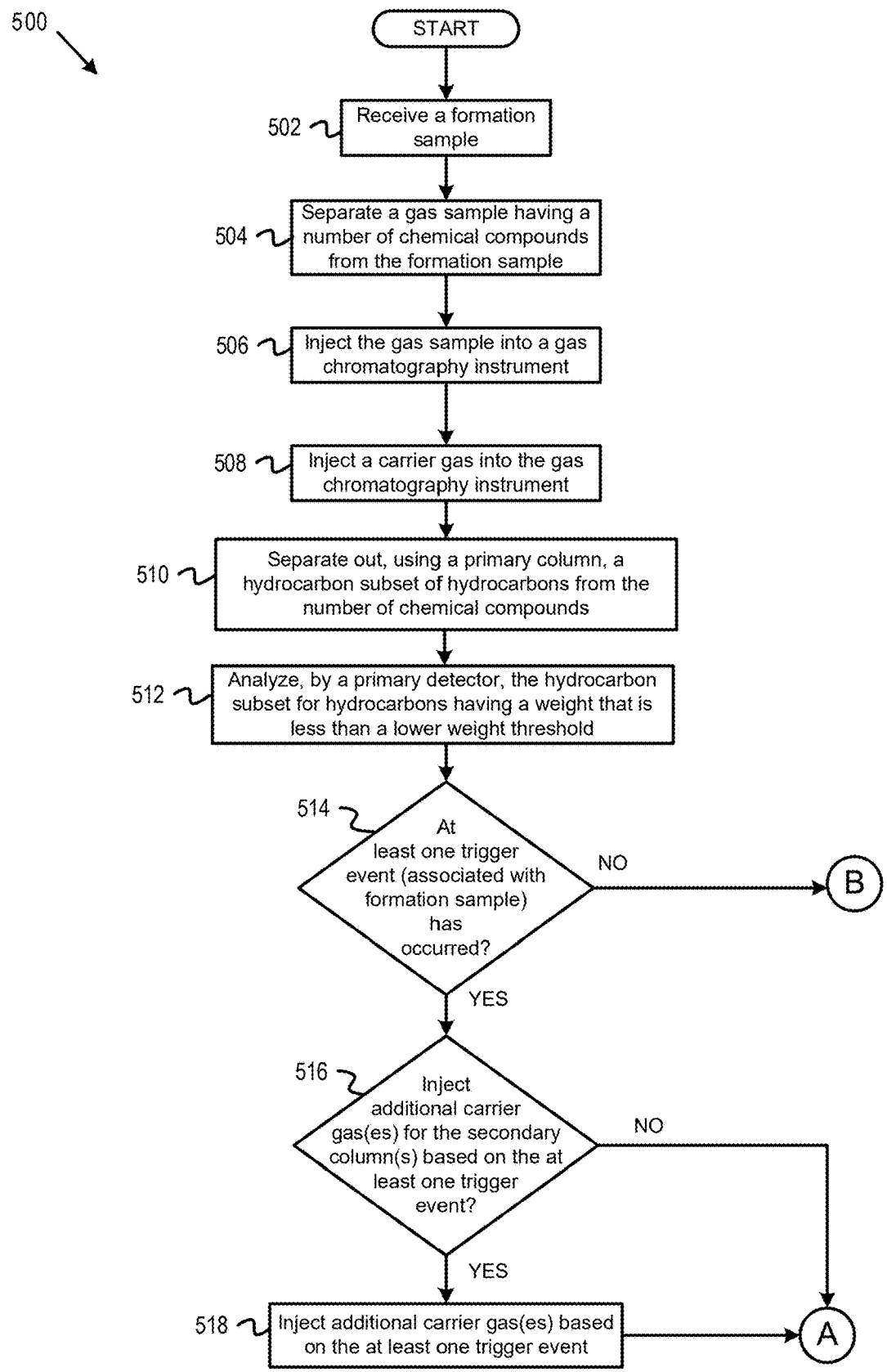
FIGS. 5-6 depict flowcharts of example operations for multi-column gas chromatography, according to some embodiments.
Figure 6:
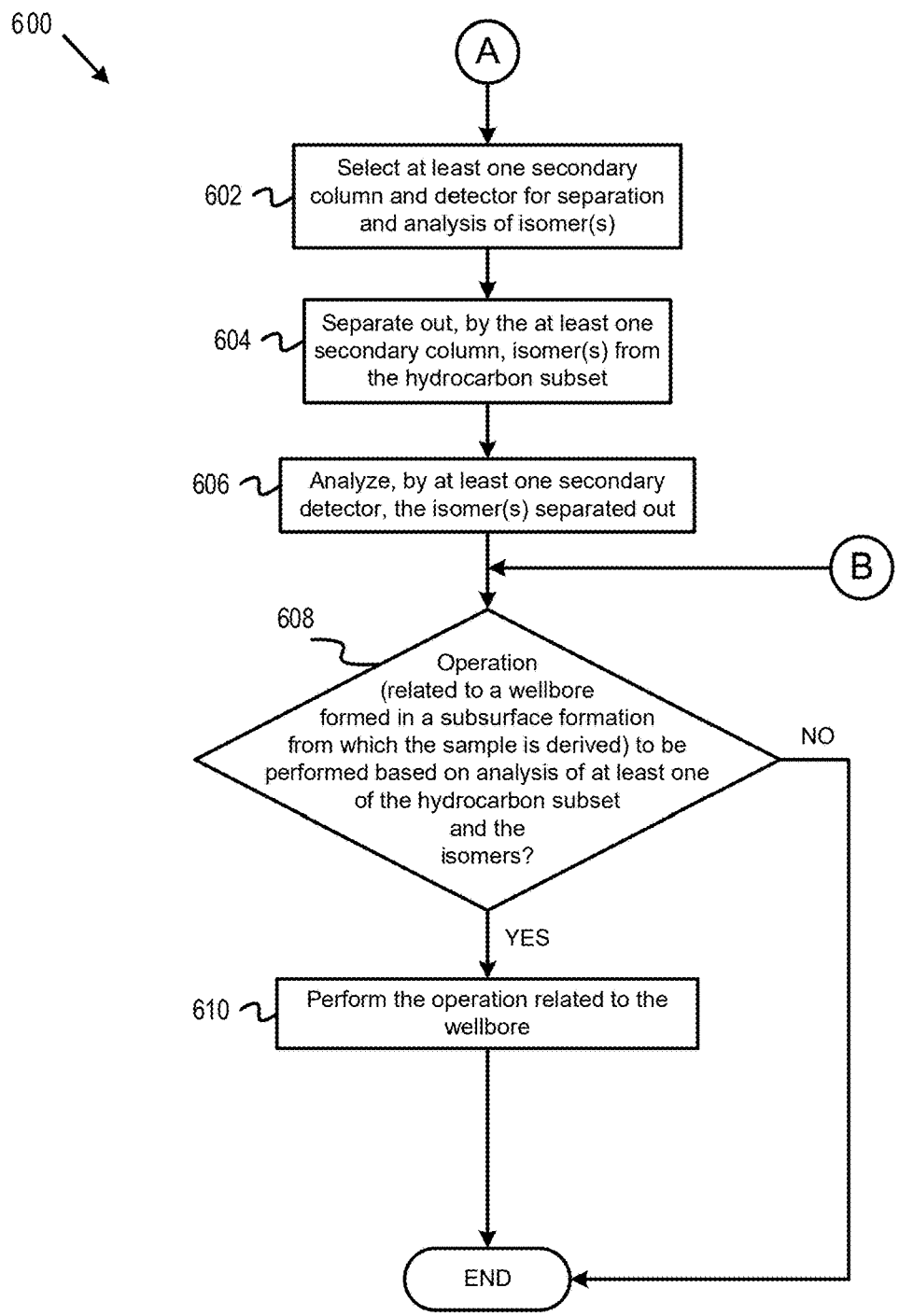

FIGS. 5-6 depict flowcharts of example operations for multi-column gas chromatography, according to some embodiments. Operations of flowcharts 500-600 of FIGS. 5-6 continue between each other through transition points A and B. Operations of the flowcharts 500-600 can be performed by software, firmware, hardware, or a combination thereof. Operations of the flowcharts 500-600 are described in reference to the example of a multi-column gas chromatography instrument and control devices of FIGS. 1-4. However, other systems and components can be used to perform the operations now described. The operations of the flowchart 500 start at block 502.

At block 502, a formation sample is received. For example, with reference to FIG. 1, the gas separator 107 receives the formation sample 150. In some implementations, the formation sample 150 may be received from a subsurface formation into which a wellbore is formed. One such example in which the formation sample 150 is received from a subsurface formation includes a drilling system, which is depicted below in reference to FIG. 7.

At block 504, a gas sample having a number of chemical compounds is separated from the formation sample. For example, with reference to FIG. 1, the gas separator 107 separates out the gas (the gas sample 152) from the other parts of the formation sample 150.

At block 506, the gas sample is injected into a gas chromatography instrument. For example, with reference to FIG. 1, the sample injector 102 receives the gas sample 152 output from the gas separator 107 and injects the gas sample 152 into the gas chromatography instrument 100.

At block 508, a carrier gas is injected into the gas chromatography instrument. For example, with reference to FIG. 1, the carrier gas injector 101 may inject the carrier gas 156 into the gas chromatography instrument 100.

At block 510, a hydrocarbon subset of hydrocarbons is separated out, using a primary column, from the number of chemical compounds. For example, with reference to FIG. 1, the primary column 108 may separate out a hydrocarbon subset that includes hydrocarbons from the number of chemical compounds.

At block 512, the hydrocarbon subset is analyzed, by a primary detector, for hydrocarbons having a weight that is less than a first/lower weight threshold. For example, with reference to FIG. 1, the primary detector 114 may analyze hydrocarbons having a weight that is considered "lighter." For example, the primary detector 114 may analyze hydrocarbons having a weight that is less than a first/lower weight threshold.

At block 514, a determination is made of whether at least one trigger event (associated with the formation sample) has occurred. For example, with reference to FIG. 1, the control device 105 may control the secondary column valve 110 by opening and closing an output to the hydrocarbons 130 to the heart cutting unit 112 based on the occurrence of at least one trigger event 154. The trigger event processor 104 may receive one or more trigger events 154 as input and process these trigger events 154 to determine whether to activate analysis of selected isomer(s) using the secondary column 116 and detector of the gas chromatography instrument 100. If a determination is made that at least one trigger event (associated with the formation sample) has not occurred, operations of the flowchart 500 continues at transition point B, which continues at transition point B of the flowchart 600 (which is further described below). If a determination is made that at least trigger event (associated with the formation sample) has occurred, operations of the flowchart 500 continue at block 516.

In some embodiments, at block 516, a determination is made of whether additional carrier gas(es) are to be injected for the secondary column(s) based on the at least one trigger event. For example, with reference to FIG. 2, if the secondary column is looking for a certain isomer, the carrier gas may not be the same as the desired isomer and the carrier gas may need to be changed. If a determination is made that additional carrier gas(es) are not to be injected for the secondary column(s), operations of the flowchart 500 continue at transition point A, which continue at transition point A of the flowchart 600 (which is further described below). If a determination is made that additional carrier gas(es) are to be injected for the secondary column(s), operations of the flowchart 500 continue at block 518.

At block 518, additional gas(es) may be injected based on the at least one trigger event. Operations of the flowchart 500 at transition point A, which continue at transition point A of the flowchart 600 (which is further described below).

Operations of the flowchart 600 are now described. From transition point A, operations continue at block 602.

At block 602, at least one secondary column and detector are selected for separation and analysis of isomer(s). For example, with reference to FIG. 1, the secondary column 116 and secondary detector 118 are selected to separate isomers having a second/heavy threshold for heavier isomers. For example, the secondary column and secondary detector 118 may process isomers of hexane, e.g., and heavier or to a specialty method for extended detection such as simulated thermal distillation to get a better separation of the isomers.

At block 604, isomer(s) from the hydrocarbon subset are separated out by the at least one secondary column. For example, with reference to FIG. 1, the secondary column 116 receives the output from the heart cutting unit 112 and separates out at the least one selected isomer from the hydrocarbons.

At block 606, the isomer(s) separated out are analyzed by the at least one detector. For example, with reference to FIG. 1, the secondary detector 118 may be configured to analyze the at least one selected isomer separated out.

Operations from transition point B continue at block 608. Thus, either from block 606 or the transition point B, operations of the flowchart 600 continue at block 608.

At block 608, a determination is made of whether an operation (related to a wellbore formed in a subsurface formation from which the sample is derived) is to be performed based on analysis of at least one of the hydrocarbon subset and the isomers. For example, if these operations are performed on an active formation sample from a drilling operation, the drilling operation may be modified. For instance, the speed of the drilling can be reduced if the subsurface formation being drilled (and from which the formation sample is originating) has a threshold level of one or more types of hydrocarbons. Also in such an example, the direction of the drilling can be changed in order to stay within this zone of the subsurface formation.

As another example, the drilling may stop if this subsurface formation being drilled (and from which the formation sample is originating) has a threshold level of water or other non-hydrocarbons. If it is determined that the operation is not to be performed, operations of the flowchart 600 are complete. If it is determined that the operation is to be performed, operations of the flowchart 600 continue at block 610.

At block 610, the operation related to the wellbore is performed. For example, drilling may continue to collect for formation samples or drilling may proceed to a different geologic target. Operations of the flowchart 600 are complete.

Example System

An example system during drilling in which example embodiments that include multi-column gas chromatography for analysis of a formation sample is now described. While described in reference to a drilling operation, example embodiments may be used in various wellbore applications and at various stages of drilling and/or production of hydrocarbons from the subsurface formations in which the wellbore is formed.

Figure 7:
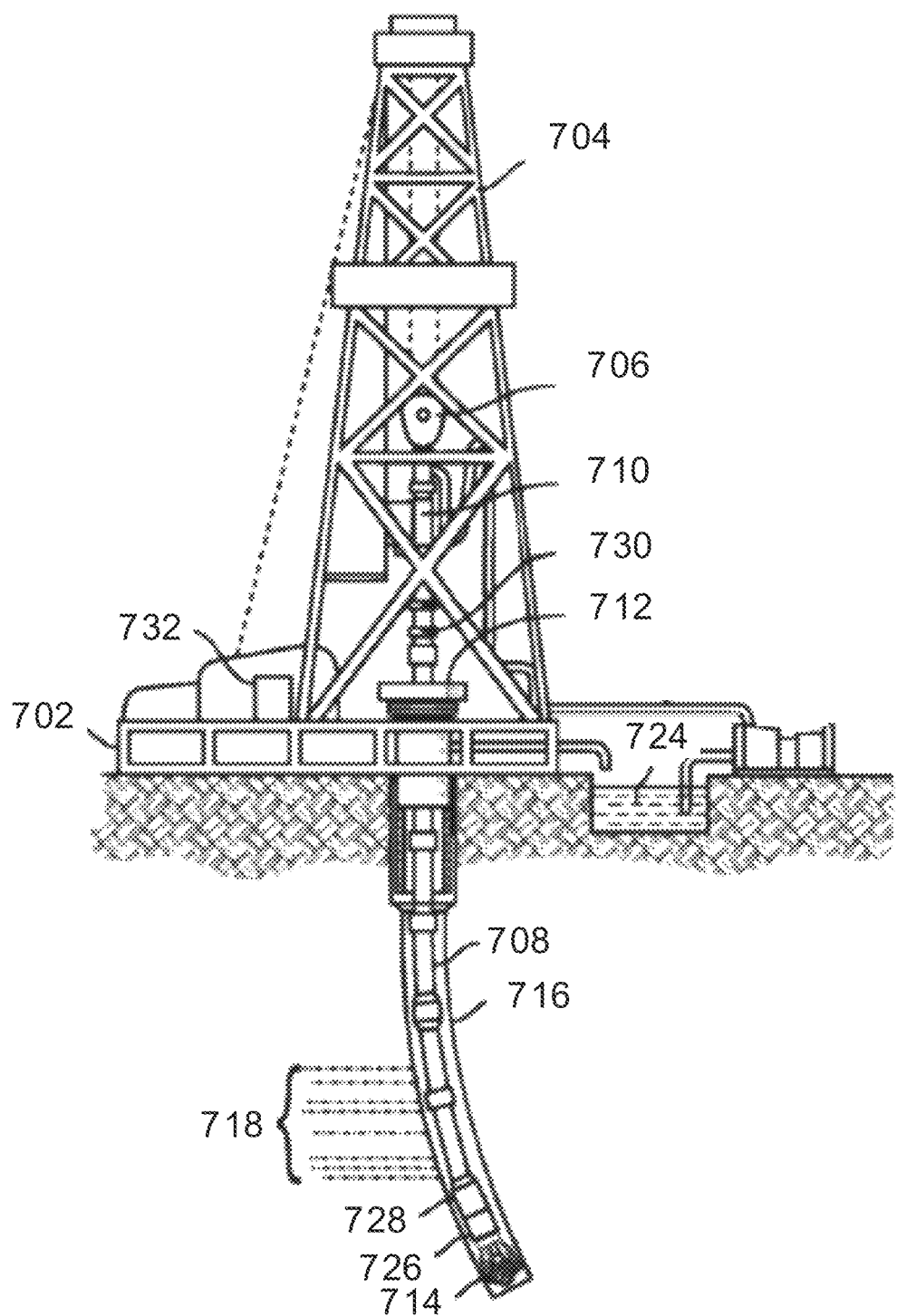
FIG. 7 depicts an example system for drilling a wellbore, according to some embodiments.

FIG. 7 depicts an example system for drilling a wellbore, according to some embodiments. A drilling platform 702 supports a derrick 704 having a traveling block 706 for raising and lowering a drill string 708 into a wellbore. A top drive 710 supports and rotates the drill string 708 as the string is lowered through a well head 712. The drill string's rotation (and/or a downhole motor) drives a drill bit 714 to extend the borehole through subsurface formations 721. Mud recirculation equipment 716 draws drilling fluid from a retention pit 724 and pumps it through a feed pipe 718 to top drive 710, through the interior of drill string 708 to the drill bit 714, through orifices in drill bit, through the annulus around drill string 708 to a blowout preventer at the surface, and through a discharge pipe into the pit 724. The drilling fluid transports cuttings from the borehole into the pit 724 and aids in maintaining the borehole integrity.

During drilling, formation samples from the subsurface formations 721 may flow into the annulus around the drill string 708 and flow to the surface of the wellbore. Such formation samples may be processed to analyze such samples using any one of the example multi-column gas chromatography instruments and control devices (described herein). In some implementations, the formation samples may be captured downhole using formation fluid sampling tools. These captured formation samples may be processed downhole and/or transported for processing at the surface.

For example, one or more logging tools 726 may be integrated into a bottomhole assembly 780 near the bit 714. Suitable logging tools include formation fluid sampling tools, acoustic logging tools, electromagnetic resistivity tools, and nuclear magnetic resonance tools, among others. Logging while drilling tools usually take the form of a drill collar, i.e., a thick-walled tubular that provides weight and rigidity to aid the drilling process. As the bit extends the borehole through the formations, the logging tool(s) collect measurements of formation characteristics. Other tools and sensors can also be included in the bottomhole assembly 780 to gather measurements of various drilling parameters such as position, orientation, weight-on-bit, borehole diameter, etc. Control/telemetry module 728 collects data from the various bottomhole assembly instruments (including position and orientation information) and stores them in internal memory. Selected portions of the data can be communicated to surface receivers 730 by, e.g., mud pulse telemetry. Other logging-while drilling telemetry methods also exist and could be employed. For example, electromagnetic telemetry or through-wall acoustic telemetry can be employed with an optional repeater 732 to extend the telemetry range. As another example, the drill string 708 could be formed from wired drillpipe that enables waveforms or images to be transmitted to the surface in real time to enable quality control and processing to optimize the logging resolution. Most telemetry systems also enable commands to be communicated from the surface to the control and telemetry module to configure the operation of the tools.

Example Computer

Figure 8:
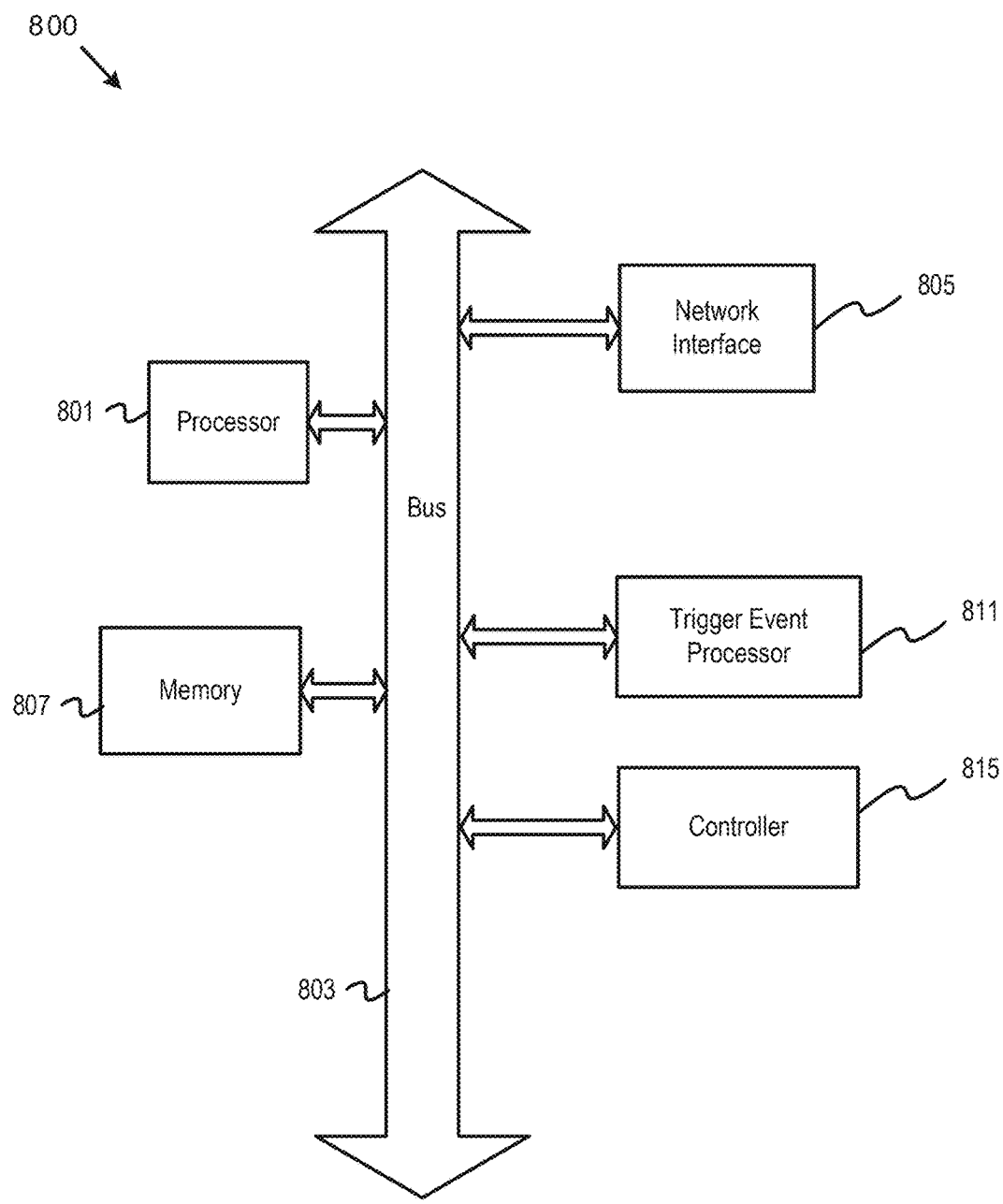
FIG. 8 depicts an example computer, according to some embodiments.

FIG. 8 depicts an example computer, according to some embodiments. FIG. 8 depicts a computer 800 that includes a processor 801 (possibly including multiple processors, multiple cores, multiple nodes, and/or implementing multithreading, etc.). The computer 800 includes a memory 807. The memory 807 may be system memory or any one or more of the above already described possible realizations of machine-readable media. The computer 800 also includes a bus 803 and a network interface 805.

The computer 800 also includes a trigger event processor 811 and a controller 815. The trigger event processor 811 and the controller 815 can perform one or more of the operations described herein. For example, the trigger event processor 811 can process the one or more trigger events. The controller 815 can perform various control operations of the gas chromatography instrument based on the one or more trigger events.

Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for simulating drill bit abrasive wear and damage during the drilling of a wellbore as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Aspects disclosed herein include:
Aspect A: An apparatus comprising a gas chromatography instrument and a controller. The gas chromatography instrument comprises a sample injector configured to inject a gas sample that includes a number of chemical compounds; a primary column to separate out a hydrocarbon subset that includes hydrocarbons from the number of chemical compounds; a secondary column valve coupled to an output of the primary column; a primary detector coupled to a first output of the secondary column valve and configured to analyze the hydrocarbons of the hydrocarbon subset; a heart cutting unit coupled to a second output of the secondary column valve, the heart cutting unit configured to cut, from the hydrocarbon subset, at least one isomer having a weight greater than a threshold; a secondary column coupled to an output of the heart cutting unit, the secondary column configured to separate out the at least one isomer; and a secondary detector configured to analyze the at least one isomer separated out. The controller is configured to control the secondary column valve such that the controller is to open the secondary column valve to output the hydrocarbons to the heart cutting unit in response to at least one trigger event having occurred.

Aspect B: A method, the method comprising injecting, into a gas chromatography instrument, a gas sample having a number of chemical compounds; separating out, by a primary column, a hydrocarbon subset that includes hydrocarbons from the number of chemical compounds; analyzing, by a primary detector, the hydrocarbon subset for hydrocarbons having a weight that is less than a lower weight threshold; determining whether at least one trigger event that is associated with gas sample has occurred; and in response to determining that the at least one trigger event occurred, separating out, by a secondary column, at least one isomer from the hydrocarbon subset; and analyzing, by a secondary detector, the at least one isomer separated out by the secondary column.

Aspect C: A system comprising: a gas separator, a gas chromatography instrument, and a controller. The gas separator, during drilling of a wellbore into a subsurface formation by a drill string, to receive a formation sample from the subsurface formation, wherein the gas separator is to separate out a gas sample from the formation sample. The gas chromatography instrument comprising: a sample injector configured to inject the gas sample that includes a number of chemical compounds; a primary column to separate out a hydrocarbon subset that includes hydrocarbons from the number of chemical compounds; a secondary column valve coupled to an output of the primary column; a primary detector coupled to a first output of the secondary column valve and configured to analyze the hydrocarbons of the hydrocarbon subset; a heart cutting unit coupled to a second output of the secondary column valve, the heart cutting unit configured to cut, from the hydrocarbon subset, at least one isomer having a weight greater than a threshold; a secondary column coupled to an output of the heart cutting unit, the secondary column configured to separate out the at least one isomer; and a secondary detector configured to analyze the at least one isomer separated out. The controller configured to control the secondary column valve such that the controller is to open the secondary column valve to output the hydrocarbons to the heart cutting unit in response to at least one trigger event having occurred, wherein the controller is configured to transmit a communication to a device to cause the device to perform or adjust the drilling, based on analysis of at least one of the hydrocarbon subset and the isomers separated out.

Aspects A, B, and C may have one or more of the following additional elements in combination:

Element 1: wherein the at least one trigger event comprises that the number of chemical compounds includes at least one isomer having a weight greater than a heavy weight threshold.

Element 2: wherein the at least one trigger event comprises the gas sample being injected being a formation sample that originates from a subsurface formation at a depth in a wellbore within a trigger depth range.

Element 3: wherein the trigger depth range comprises a depth range having a probability of recoverable hydrocarbon that is greater than a threshold.

Element 4: wherein the controller is configured to transmit a communication to a device to cause the device to perform or adjust a downhole operation in a wellbore formed in a subsurface formation from which the gas sample originated, based on analysis of at least one of the hydrocarbon subset and the at least one isomer separated out.

Element 5: wherein the gas chromatography instrument comprises a back flush valve having an input coupled to an output of the sample injector and an output coupled to an input of the secondary column, and wherein the controller is to control the back flush valve such that the controller is to open the back flush valve to flow the hydrocarbons to the heart cutting unit in response to a weight of at least one of the hydrocarbons being greater than a threshold.

Element 6: wherein the gas chromatography instrument comprises a carrier gas valve having multiple inputs, wherein each of the multiple inputs is coupled to input a different carrier gas to mix with the gas sample, and wherein the controller is to control the carrier gas valve such that the controller is to selectively open at least one of the multiple inputs based on types of the hydrocarbons.

Element 7: wherein determining whether the at least one trigger event occurred comprises determining whether the number of chemical compounds includes at least one isomer having a weight greater than an isomer threshold.

Element 8: wherein the gas sample is from a formation sample, wherein determining whether the at least one trigger event occurred comprises determining that the formation sample originates from a subsurface formation at a depth in a wellbore within a trigger depth range.

Element 9: wherein determining whether the at least one trigger event occurred comprises determining whether an amount of gas in the gas sample exceeds a minimum gas level threshold.

Element 10: in response to determining that the at least one trigger event occurred and prior to separating out the at least one isomer, cutting, from the hydrocarbon subset, at least one isomer having a weight greater than a threshold.

Element 11: wherein the method further comprises performing a downhole operation in a wellbore based on at least one of analyzing the hydrocarbon subset and analyzing the at least one isomer separated out.

Element 12: wherein the method further comprises receiving a formation sample from a subsurface formation into which the wellbore is formed, the formation sample including the gas sample; and separating the gas sample from the formation sample.

Element 13: wherein the gas chromatography instrument comprises a back flush valve having an input coupled to an output of the sample injector and an output coupled to an input of the secondary column.

Element 14: wherein the controller is to control the back flush valve such that the controller is to open the back flush valve to flow the hydrocarbons to the heart cutting unit in response to a weight of at least one of the hydrocarbons being greater than a threshold.

Those skilled in the art to which this application relates will appreciate that other and further additions, deletions, substitutions and modifications may be made to the described embodiments.

The invention claimed is:

1. An apparatus comprising:
a gas chromatography instrument comprising:
  a sample injector configured to inject a gas sample that includes a number of chemical compounds;
  a primary column to separate out a hydrocarbon subset that includes hydrocarbons from the number of chemical compounds;
  a secondary column valve coupled to an output of the primary column;
  a primary detector coupled to a first output of the secondary column valve and configured to analyze the hydrocarbons of the hydrocarbon subset;
  a heart cutting unit coupled to a second output of the secondary column valve, the heart cutting unit configured to cut, from the hydrocarbon subset, isomers having a weight greater than a threshold;
  a secondary column coupled to an output of the heart cutting unit, the secondary column configured to separate out at least one isomer from the cut isomers; and
  a secondary detector configured to analyze the at least one isomer separated out; and
a controller to control the secondary column valve such that the controller is to open the secondary column valve to output the hydrocarbons to the heart cutting unit in response to at least one trigger event having occurred.

2. The apparatus of claim 1, wherein the at least one trigger event comprises that the number of chemical compounds includes at least one isomer having a weight greater than a heavy weight threshold.

3. The apparatus of claim 1, wherein the at least one trigger event comprises the gas sample being injected being a formation sample that originates from a subsurface formation at a depth in a wellbore within a trigger depth range.

4. The apparatus of claim 3, wherein the trigger depth range comprises a depth range having a probability of recoverable hydrocarbon that is greater than a threshold.

5. The apparatus of claim 1, wherein the controller is configured to transmit a communication to a device to cause the device to perform or adjust a downhole operation in a wellbore formed in a subsurface formation from which the gas sample originated, based on analysis of at least one of the hydrocarbon subset and the at least one isomer separated out.

6. The apparatus of claim 1,
wherein the gas chromatography instrument comprises a back flush valve having an input coupled to an output of the sample injector and an output coupled to an input of the secondary column, and
wherein the controller is to control the back flush valve such that the controller is to open the back flush valve to flow the hydrocarbons to the heart cutting unit in response to a weight of at least one of the hydrocarbons being greater than a threshold.

7. The apparatus of claim 1,
wherein the gas chromatography instrument comprises a carrier gas valve having multiple inputs, wherein each of the multiple inputs is coupled to input a different carrier gas to mix with the gas sample, and
wherein the controller is to control the carrier gas valve such that the controller is to selectively open at least one of the multiple inputs based on types of the hydrocarbons.

8. A method comprising:
injecting, into a gas chromatography instrument, a gas sample having a number of chemical compounds;
separating out, by a primary column, a hydrocarbon subset that includes hydrocarbons from the number of chemical compounds;
analyzing, by a primary detector, the hydrocarbon subset for hydrocarbons having a weight that is less than a lower weight threshold;
determining whether at least one trigger event that is associated with gas sample has occurred; and
in response to determining that the at least one trigger event occurred,
  separating out, by a secondary column, at least one isomer from the hydrocarbon subset; and
  analyzing, by a secondary detector, the at least one isomer separated out by the secondary column.

9. The method of claim 8, wherein determining whether the at least one trigger event occurred comprises determining whether the number of chemical compounds includes at least one isomer having a weight greater than an isomer threshold.

10. The method of claim 8, wherein the gas sample is from a formation sample, wherein determining whether the at least one trigger event occurred comprises determining that the formation sample originates from a subsurface formation at a depth in a wellbore within a trigger depth range.

11. The method of claim 10, wherein the trigger depth range comprises a depth range having a probability of recoverable hydrocarbon that is greater than a threshold.

12. The method of claim 8, wherein determining whether the at least one trigger event occurred comprises determining whether an amount of gas in the gas sample exceeds a minimum gas level threshold.

13. The method of claim 8, further comprising:
in response to determining that the at least one trigger event occurred and prior to separating out the at least one isomer,
  cutting, from the hydrocarbon subset, at least one isomer having a weight greater than a threshold.

14. The method of claim 8, further comprising:
performing a downhole operation in a wellbore based on at least one of analyzing the hydrocarbon subset and analyzing the at least one isomer separated out.

15. The method of claim 14, further comprising:
receiving a formation sample from a subsurface formation into which the wellbore is formed, the formation sample including the gas sample; and
separating the gas sample from the formation sample.

16. A system comprising:
a gas separator, during drilling of a wellbore into a subsurface formation by a drill string, to receive a formation sample from the subsurface formation, wherein the gas separator is to separate out a gas sample from the formation sample;
a gas chromatography instrument comprising:
  a sample injector configured to inject the gas sample that includes a number of chemical compounds;
  a primary column to separate out a hydrocarbon subset that includes hydrocarbons from the number of chemical compounds;

a secondary column valve coupled to an output of the primary column;

a primary detector coupled to a first output of the secondary column valve and configured to analyze the hydrocarbons of the hydrocarbon subset;

a heart cutting unit coupled to a second output of the secondary column valve, the heart cutting unit configured to cut, from the hydrocarbon subset, isomers having a weight greater than a threshold;

a secondary column coupled to an output of the heart cutting unit, the secondary column configured to separate out at least one isomer from the cut isomers; and a secondary detector configured to analyze the at least one isomer separated out; and a controller to control the secondary column valve such that the controller is to open the secondary column valve to output the hydrocarbons to the heart cutting unit in response to at least one trigger event having occurred, wherein the controller is configured to transmit a communication to a device to cause the device to perform or adjust the drilling, based on analysis of at least one of the hydrocarbon subset and the isomers separated out.

17. The system of claim 16, wherein the at least one trigger event comprises that the number of chemical compounds includes at least one isomer having a weight greater than a heavy weight threshold.

18. The system of claim 16, wherein the at least one trigger event comprises the formation sample originating from the subsurface formation at a depth in the wellbore within a trigger depth range.

19. The system of claim 18, wherein the trigger depth range comprises a depth range having a probability of recoverable hydrocarbon that is greater than a threshold.

20. The system of claim 16,
wherein the gas chromatography instrument comprises a back flush valve having an input coupled to an output of the sample injector and an output coupled to an input of the secondary column, and
wherein the controller is to control the back flush valve such that the controller is to open the back flush valve to flow the hydrocarbons to the heart cutting unit in response to a weight of at least one of the hydrocarbons being greater than a threshold.

* * * * *